United States Patent
Neumaier

(10) Patent No.: US 7,134,698 B2
(45) Date of Patent: Nov. 14, 2006

(54) SEALING DEVICE FOR A HIGH-PRESSURE SEALING OF LINE JUNCTIONS

(75) Inventor: Martin Neumaier, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/961,363

(22) Filed: Oct. 8, 2004

(65) Prior Publication Data

US 2005/0082823 A1    Apr. 21, 2005

Related U.S. Application Data

(63) Continuation of application No. PCT/DE03/01165, filed on Apr. 9, 2003.

(30) Foreign Application Priority Data

Apr. 12, 2002    (DE)    ............... 102 16 280

(51) Int. Cl.
*F16L 13/14*    (2006.01)
(52) U.S. Cl. .................... 285/382.4; 285/338
(58) Field of Classification Search ............... 285/346, 285/354, 379, 382.5, 382.4, 338
See application file for complete search history.

(56) References Cited

U.S. PATENT DOCUMENTS

| | | | | |
|---|---|---|---|---|
| 648,232 A | * | 4/1900 | Brandt | ................. 285/331 |
| 924,039 A | * | 6/1909 | Clark | ................. 285/10 |
| 1,098,974 A | * | 6/1914 | Reilly | ................. 285/354 |
| 1,906,826 A | * | 5/1933 | Smith et al. | ................. 285/331 |
| 2,258,941 A | * | 10/1941 | Wayman | ................. 285/149.1 |
| 2,330,864 A | * | 10/1943 | Bruno | ................. 285/332.2 |
| 2,731,279 A | * | 1/1956 | Main, Jr. | ................. 285/95 |
| 2,780,483 A | * | 2/1957 | Kessler | ................. 285/332.3 |
| 4,262,941 A | | 4/1981 | Lalikos et al. | ................. 285/110 |
| 4,484,750 A | * | 11/1984 | Scruggs | ................. 285/354 |
| 4,838,583 A | * | 6/1989 | Babuder et al. | ................. 285/354 |
| 5,033,435 A | * | 7/1991 | Ostarello et al. | ................. 123/469 |
| 5,131,695 A | * | 7/1992 | Wiser | ................. 285/354 |
| 5,251,941 A | * | 10/1993 | McGarvey | ................. 285/328 |
| 5,553,902 A | * | 9/1996 | Powers | ................. 285/350 |
| 5,695,225 A | * | 12/1997 | Grenga | ................. 285/125.1 |
| 6,805,384 B1 | * | 10/2004 | Wiser | ................. 285/354 |

FOREIGN PATENT DOCUMENTS

DE    884 437    7/1953

* cited by examiner

*Primary Examiner*—David Bochna
(74) *Attorney, Agent, or Firm*—Baker Botts L.L.P.

(57) ABSTRACT

A sealing device (1) for a high-pressure sealing of line junctions comprises a cutting edge (2) and a protective edge (3). The cutting edge (2) permits a sealing of the line junction by means of plastic deformation. The protective edge (3) extends essentially parallel to the cutting edge (2) and projects beyond the cutting edge (2) in an axial direction 0-0 of the line.

8 Claims, 1 Drawing Sheet

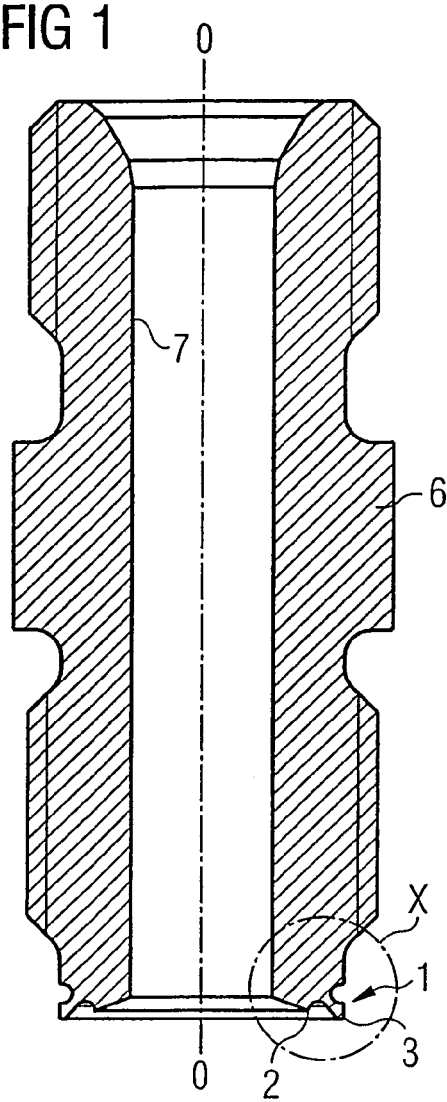
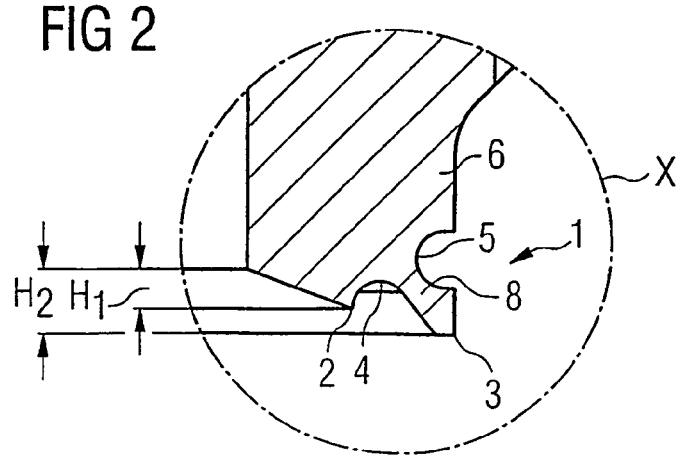

SEALING DEVICE FOR A HIGH-PRESSURE SEALING OF LINE JUNCTIONS

CROSS REFERENCE TO RELATED APPLICATION

This application is a continuation of International Application No. PCT/DE03/01165 filed Apr. 9, 2003 which designates the United States, and claims priority to German application no. 102 16 280.8 filed Apr. 12, 2002.

TECHNICAL FIELD OF THE INVENTION

The present invention relates to a sealing device for a high-pressure sealing of line junctions in fuel injectors.

DESCRIPTION OF THE RELATED ART

Fuel injectors are used for example in common rail injection systems to inject fuel under high pressure into the combustion chamber, which is fed to the injector via a high-pressure line from a storage tank. Because of the very high pressures involved there are frequently sealing problems between individual components of the common rail system. These types of sealing problems should however be avoided in any event, in order to meet environmental requirements on the one hand and on the other hand to prevent escaping fuel catching fire on hot parts of the engine compartment. This is why expensive sealing devices have been used by known fuel injectors.

For example, to seal a pressure pipe connector which is used as an intermediate section between the injector and a high-pressure line, a seal is made between the pressure pipe connector and the injector by means of an axially sealing mild steel washer. The mild steel washer is plastically deformed when the pressure pipe connector is fitted to the injector to enable a seal to be made between the two parts. Another hydraulic sealing option which is not however used with fuel injectors is provided by a cutting edge formed on a component which is plastically deformed when the component is turned, which enables the surfaces to be sealed to adapt to and seal with each other in the ideal manner. This cutting edge is however very sensitive to damage, such for example from components knocking into each other, such as can occur for example during assembly or during manufacturing, these are being transported as loose parts.

SUMMARY OF THE INVENTION

The object of the present invention is therefore to provide a sealing device for a high-pressure sealing of line junctions, especially with fuel injection systems which with a simple structure and simple, low cost manufacturing can prevent damage to the cutting edge, so that a safe seal is always guaranteed.

This object can be achieved by a sealing device for a high-pressure sealing of line junctions, comprising a cutting edge to create an essentially ring-shaped seal by means of plastic deformation and a protective edge, which runs essentially in parallel to the cutting edge and projects in an axial direction over the cutting edge.

The object can also be achieved by a pressure pipe connector having a cylindrical body comprising a cutting edge to create an essentially ring-shaped seal by means of plastic deformation; and a protective edge, which runs essentially in parallel to the cutting edge and projects in an axial direction of the cylindrical body over the cutting edge.

A first cutout can be embodied between the cutting edge and the protective edge. A second cutout can be embodied on the side of the protective edge facing away from the cutting edge. The cutout can be embodied in a U-shaped cross section. The protective edge can be around twice as high in an axial direction as the cutting edge. The protective edge, starting from the line axis can be arranged outside the cutting edge. The protective edge, starting from the line axis can be arranged inside the cutting edge. The protective edge, starting from the line axis can be arranged outside and inside the cutting edge. The sealing device can be arranged on a pressure pipe connector which connects a fuel injector and a high-pressure line.

The inventive sealing device for a high-pressure sealing of line junctions comprises a cutting edge as well as a protective edge. The cutting edge serves to create a seal by means of plastic deformation, with both the cutting edge and also the component against the cutting edge being able to be plastically deformed. The protective edge runs essentially in parallel to the cutting edge and projects in the axial direction of the line over the cutting edge. The projecting protective edge thus provides protection for the cutting edge, since when parts knock together the protective edge is hit first and thus deforms instead of the cutting edge. This can prevent damage to the cutting edge occurring, and thus an improved sealing characteristic of the sealing device can be achieved In this case the protective edge is embodied in such a way that it can be easily deformed during installation of the component so that the actual sealing effect is always provided by the cutting edge of the sealing device. Since the protective edge projects in an axial direction over the cutting edge, the protective edge is deformed in an axial direction in such a way that the cutting edge comes into contact with the next component to make the seal. This means that in accordance with the invention an especially low-cost protection against damage can be provided amazingly simply for a cutting edge which makes a seal.

To make it possible for the protective edge to deform especially easily during assembly, a first indentation or cutout is preferably embodied between the cutting edge and the protective edge.

To allow an even better slight deformability of the protective edge, a second cutout is embodied in the side of the protective edge facing away from the cutting edge. This produces a neck-shaped constriction between the protective edge and the component, so that a protective edge which is easily deformable using only slight force is provided.

In an especially preferred embodiment the cutouts have a U-shaped cross section, so that no abrupt transitions arise between the cutting edge and the protective edge. This ensures a secure deformation of the protective edge during assembly, to release the cutting edge without the protective edge being able to break off for example and an unwanted sharp broken edge being produced.

To securely protect the cutting edge the protective edge is preferably approximately twice as high in the axial direction as the cutting edge.

Especially preferred is arranging the protective edge outside the cutting edge. In accordance with another preferred embodiment the protective edge is arranged within the cutting edge. Also preferred is a protective edge arranged both inside and also outside the cutting edge enabling two-sided protection to be provided for the cutting edge.

An especially preferred arrangement of the sealing device in accordance with the invention, consisting of a cutting edge and a protective edge is on a pressure pipe connection connecting a fuel injector to a common rail system to a high-pressure line. In this case the inventive sealing device is preferably embodied between the injector and the pressure pipe connector.

BRIEF DESCRIPTION OF THE DRAWINGS

The present invention is described below on the basis of a preferred exemplary embodiment in conjunction with the drawing. in the drawing:

FIG. 1 is a schematic cross-sectional view of a pressure pipe connector with a sealing device in accordance with an exemplary embodiment of the present invention, and FIG. 2 is an enlarged view of the details X of FIG. 1.

DETAILED DESCRIPTION OF THE PREFERRED EMBODIMENTS

FIG. 1 shows a pressure pipe connector 6 which features an inventive sealing device 1 at one of its ends in axial direction 0-0. The pressure pipe connector 6 is used as an intermediate element between an injector of a fuel injection system and a high-pressure line. Fuel under high pressure is fed to the injector via this high-pressure line. The sealing device 1 is arranged at the end of the pressure pipe connection 6 which is attached to the injector.

The inventive sealing device 1 is shown in detail in FIG. 2. The sealing device 1 comprises a cutting edge 2 and a protective edge 3. The cutting edge 2 is arranged roughly in the middle of the wall thickness of the pressure pipe connector 6 and slopes inwards conically towards a high-pressure line 7 embodied in the pressure pipe connector 6. The protective edge 3 is arranged on the extreme outside edge of the pressure pipe connector 6. Between the cutting edge 2 and the protective edge 3 is a first cutout 4 embodied in the form of a channel. A second cutout 5 is embodied on the cylindrical sleeve of the pressure pipe connector 6 and, thus, on the side of the protective edge 3 facing away from the cutting edge 2. The second cutout 5 is in this case arranged such that between the first cutout 4 and the second cutout 5 a narrowing in the form of a neck 8 is formed.

The cutting edge 2 and the protective edge 3 are both embodied in the form of rings, with the protective edge 3 running in parallel to the cutting edge 2. I.e. the two edges 2, 3 are arranged like concentric circles.

As can further be seen from FIG. 2, the cutting edge 2 features a height $H_1$ in the direction of the axial direction 0-0 of the pressure pipe connector 6. The protective edge 3 feature a height $H_2$ in the direction of the axial direction 0-0. In this case the height $H_2$ is around twice as much as the height $H_1$. This ensures that the protective edge 3 projects by a prespecified amount in the axial direction 0-0 to guarantee sufficient protection for the cutting edge 2.

Now when the pressure pipe connector 6 is attached to the injector, the protective edge 3 is first deformed, with the protective edge 3 being easily deformable by a slight force through the embodiment of a neck area 8 between the first and the second cutout. This releases the actual sealing edge of the sealing device 1 embodied as cutting edge 2. During further fitting of the pressure pipe connector 6 a plastic deformation of the cutting edge 2 and of the area on the injector opposite the cutting edge now takes place, with the actual seal being made between the pressure pipe connector 6 and the injector. The protective edge 3 thus does not serve to make the actual seal but merely to protect the cutting edge 2.

By providing the first and second cutout 4, 5 sufficient free space for deformation is further provided during fitting of the pressure pipe connection 6 into which the protective edge 3 can be pressed on installation.

The preceding description of the exemplary embodiment in accordance with the present invention is only used for illustrative purposes and not for the purposes of limiting the invention. Various changes and modification are possible within the framework of the invention without departing from the scope of the invention as well as its equivalents.

I claim:

1. A sealing device for high-pressure sealing of line junctions within a fuel injection system, comprising:
   a cutting edge to create an essentially ring-shaped seal by means of plastic deformation of the cutting edge, wherein the cutting edge extends in the axial direction to a first height;
   a protective edge running substantially in parallel to and radially outward from the cutting edge and projecting in an axial direction over the cutting edge, the protective edge extends in the axial direction to a second height about twice as high as the first height;
   wherein a first cutout is embodied between the cutting edge and the protective edge and a second cutout is embodied on the side of the protective edge facing away from the cutting edge; and
   wherein the first cutout has a U-shaped cross section.

2. The sealing device in accordance with claim 1, wherein the first cutout has a U-shaped cross section.

3. The sealing device in accordance with claim 1, wherein the protective edge, starting from the axis is arranged outside the cutting edge.

4. The sealing device in accordance with claim 1, wherein the sealing device is arranged on a pressure pipe connector which connects a fuel injector and a high-pressure line.

5. A pressure pipe connector for a fuel injection system having a cylindrical body comprising:
   a generally cylindrical sleeve having a cutting edge and protective edge;
   the cutting edge to create an essentially ring-shaped seal by means of plastic deformation of the cutting edge, wherein the cutting edge extends in the axial direction to a first height;
   the protective edge, which runs essentially in parallel to and radially outward from the cutting edge and projects in an axial direction of the cylindrical body over the cutting edge, the protective edge extending in the axial direction to a second height about twice as high as the first height;
   wherein a first cutout is embodied between the cutting edge and the protective edge and a second cutout is embodied on the side of the protective edge facing away from the cutting edge; and
   wherein the first cutout has a U-shaped cross section.

6. The pressure pipe in accordance with claim 5, wherein the first cutout has a U-shaped cross section.

7. The pressure pipe in accordance with claim 5, wherein the protective edge, starting from the axis is arranged outside the cutting edge.

8. The pressure pipe in accordance with claim 5, wherein the cylindrical sleeve connects a fuel injector and a high-pressure line.

* * * * *